United States Patent
Scholl et al.

[11] Patent Number: 6,145,001
[45] Date of Patent: *Nov. 7, 2000

[54] NETWORK MANAGEMENT GATEWAY

[75] Inventors: Thomas H. Scholl; William E. Witowsky, both of Gaithersburg, Md.

[73] Assignee: Telogy Networks, Inc., Germantown, Md.

[*] Notice: This patent is subject to a terminal disclaimer.

[21] Appl. No.: 09/003,468

[22] Filed: Jan. 5, 1998

Related U.S. Application Data

[63] Continuation of application No. 08/444,483, May 19, 1995, Pat. No. 5,742,762.

[51] Int. Cl.[7] .......................... G06F 15/16; G06F 15/173
[52] U.S. Cl. ........................ 709/223; 709/200; 709/227
[58] Field of Search .................................. 709/200, 227, 709/223, 224, 249; 370/85.13; 340/825

[56] References Cited

U.S. PATENT DOCUMENTS

| | | | |
|---|---|---|---|
| 5,307,456 | 4/1994 | MacKay | 395/328 |
| 5,327,544 | 7/1994 | Lee et al. | 395/500 |
| 5,491,693 | 2/1996 | Britton et al. | 370/85.13 |
| 5,491,796 | 2/1996 | Wanderer et al. | 395/200.09 |
| 5,508,732 | 4/1996 | Bottomley et al. | 348/7 |
| 5,530,852 | 6/1996 | Meske, Jr. et al. | 395/600 |
| 5,533,116 | 7/1996 | Vesterinen | 379/243 |
| 5,559,800 | 9/1996 | Mousseau et al. | 370/85.13 |
| 5,581,558 | 12/1996 | Homey, II et al. | 370/401 |
| 5,856,974 | 1/1999 | Gervais et al. | 370/392 |
| 5,896,440 | 4/1999 | Reed et al. | 379/1 |
| 5,956,024 | 9/1999 | Strickland et al. | 345/327 |
| 5,983,270 | 11/1999 | Abraham et al. | 709/224 |
| 5,991,810 | 11/1999 | Shapiro et al. | 709/229 |
| 6,011,844 | 1/2000 | Uppaluru et al. | 379/220 |

*Primary Examiner*—Frank J. Asta
*Assistant Examiner*—Jason D. Cardone
*Attorney, Agent, or Firm*—Levy & Grandinetti

[57] ABSTRACT

The present invention provides network management of a network or multiple networks, using a Web client, and including multimedia and hypermedia capability. The present invention provides a unified, remote, graphical, transparent interface for Web users, working at a Web client, to a variety of managed networks. The present invention receives requests from a Web client forwarded by a Web server and interacts with the managed networks and their associated objects to obtain information. The present invention then converts this information in real time to hypermedia document format in HTTP and HTML, and transmits this information to the Web client via the Web server, appearing to the client as if the information received were a Web file ab initio. This permits a Web user to manage multiple networks and access multiple networks via a single Web client, thus providing a unification of the management interface for dissimilar managed networks, and devices.

7 Claims, 6 Drawing Sheets

NETWORK MANAGEMENT GATEWAY

This is a continuation of Application Ser. No. 08/444,483, filed May 19, 1995, is now U.S. Pat. No. 5,742,762.

FIELD OF INVENTION

The present invention is in the field of network management and information processing systems and methods. The present invention involves software programs and hardware. The present invention is for finding, processing, reformatting and transmitting information on the Internet and other communications networks in a variety of formats. More specifically, the present invention provides network management of a network or multiple networks, using a Web client, and includes multimedia and hypermedia capability. One embodiment of the present invention is a software product for a programmed computer that communicates with a Web server on the Internet and serves as a "manager of managers" for a variety of other networks and managed devices.

BACKGROUND OF THE INVENTION

The Net and the Web

The Internet is a global network of computers and computer networks (the "Net"). The Internet connects computers that use a variety of different operating systems or languages, including UNIX, DOS, Windows, Macintosh, and others. To facilitate and permit communication among these various systems and languages, the Internet uses a language referred to as TCP/IP ("Transmission Control Protocol/Internet Protocol"). TCP/IP protocol supports three basic applications on the Internet: transmitting and receiving electronic mail, logging into remote computers (the "Telnet"), and transferring files and programs from one computer to another ("FTP" or "File Transfer Protocol").

With the increasing size and complexity of the Internet, tools have been developed to help find information on the network, often called navigators or navigation systems. Navigation systems that have been developed include Archie, Gopher, and WAIS. The World Wide Web ("WWW" or "the Web") is a recent superior navigation system. The Web is an Internet-based navigation system, an information distribution and management system for the Internet, and a dynamic format for communications on the Web. The Web seamlessly, for the user, integrates different formats of information, including still images, text, audio, and video. A user on the Web using a "graphical user interface" (a "GUI," pronounced "gooey") may transparently communicate with different host computers on the system, and different system applications (including FTP and Telnet), and different information formats for files and documents including, for example, text, sound and graphics.

The Web uses hypertext and hypermedia. Hypertext is a subset of hypermedia and refers to computer-based "documents" in which readers move from one place to another in a document, or to another document, in a non-linear manner. To do this, the Web uses a client-server architecture, and the computers that maintain Web information are Web servers. The Web servers enable the user to access hypertext and hypermedia information through the Web and the user's computer. (The user's computer is referred to as a client computer of the Web server computers.) The clients send requests to the servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Each Web page that appears on client monitors of the Web may appear as a complex document that integrates, for example, text, images, sounds, and animations. Each such page may also contain hyperlinks to other Web documents so that a user at the client computer using a mouse may click on icons and activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called HyperText Transfer Protocol ("HTTP"). All types of data can be exchanged among Web servers and clients using this protocol, including HyperText Markup Language ("HTML"), graphics, sound, and video. HTML describes the layout, contents and hyperlinks of the documents and pages. Web clients, when browsing, convert user specified commands into HTTP GET requests, connect to the appropriate Web server, issue the command to the Web server to get information, and wait for a response. The response from the server can be the requested document or an error message.

After the document or error message is returned, the connection between the Web client and the Web server is closed. HTTP is a stateless protocol. That is, with HTTP, there is no continuous connection between each client and each server. The Web client using HTTP receives a response as HTML data or other data. After receipt, the Web client formats and presents the data or activates an ancillary application such as a sound player to present the data. To do this, the server or the client determines the various types of data received.

A Web server can log activity information regarding Web client requests for information. For each such client request, a Web server can record the Internet address of the client, the time, and the information requested. Web servers can also protect certain files from non-authenticated users.

Gateways

Also, Web servers can forward client requests for data, that neither the Web client nor the Web server can access directly, to applications called gateways. Using gateways, a Web server can support data types and resources, and access information outside of the Internet. These data types and resources accessed through gateways may not have been conceived of when the Web was created, and may not be part of the Internet.

In the process to use a gateway, the Web client collects data and formulates a request, using HTTP, and transmits the request to the Web server with the name of the gateway program to be executed. The server then communicates with the gateway. The gateway reformats the request, if necessary, and transmits it to an information server to be accessed through the gateway. The gateway receives back a response from the information server and reformats that response, if necessary, as an HTML document, which is delivered to the Web server. The Web server forwards the response to the Web client.

A gateway is a way for two software applications to communicate with each other. A gateway allows for communications between two networks that use different protocols, or which use the same protocols but do not otherwise communicate. For example, a gateway may, in effect, translate between two network protocols. For example, if one network uses TCP/IP, but a user wishes to communicate with another network that may use another protocol such as Novell, DECnet, SNA, or any of over a dozen leading brands of network protocols, then a gateway may convert the traffic back and forth from one set of protocols to the other, as the first network communicates with the second network.

Gateways tend to be specific to particular protocols used on particular networks, and also tend to be specific to the application in question. This is because, for example, the way to convert electronic mail in one network protocol, to a second network protocol, may be quite different from the way that a remote terminal session (that is, a Telnet session) on one network protocol is to be converted to the second network protocol. Conventional gateways, then, are usually for a specific application from one specific network protocol to another specific network protocol. Hence, conventional gateways are specific to the hardware platform of the two networks, the communication protocols of the two platforms, and specific applications being run.

A conventional gateway may be embodied as a software application that is resident on a Web server host, or as a software application resident on a device separate from a Web host. In the latter case, the gateway may communicate with the Web host through the Internet, or directly by other means. Examples of conventional gateways include Gopher, and FTP.

A network manager is a software application or device that manages a network and which provides various management services, including communication through the managed network and with the managed objects of the network, graphic interface with the network, and other services. Examples of existing network managers include HP OpenView, Sun NetManager, and IBM NetView.

Conventionally, for a Web client request that requires a gateway, the user invokes the name of the gateway. The Web server then identifies the gateway required, accesses the gateway application through the Internet or otherwise, and transfers the necessary request information to the gateway. The gateway then executes its function in response to the specific request. In this process, the Common Gateway Interface ("CGI") specifications are typically used.

Managing Networks

Historically, as computing and data communications requirements became more complex, companies began selecting individual items of hardware and software that best met their needs, regardless of vendor. Since each vendor's equipment generally used proprietary network management hardware and software, many companies now find themselves with a diverse assortment of incompatible networks and network management resources. Although standardization of network management protocols in the prior art, such as SNMP, help in managing multi-vendor network configurations, the user interfaces still vary quite widely in the prior art when dealing with multi-vendor network situations. No one prior art user interface or network manager can serve across most multi-vendor configurations.

To address this problem implementors have developed the concept of "manager of network managers" or "manager of managers" ("MOM") whereby one system would provide a common interface for multiple managed networks. Unfortunately there is no standard for the MOM, and no MOM has previously been provided that would provide network management by a Web browser, remotely through the Web, from a Web client.

SUMMARY OF THE INVENTION

The present invention has several objects. It is an object of the present invention to provide network management of a network or multiple networks, using a Web client, and including multimedia and hypermedia capability. It is an object of the present invention to process requests from Web clients forwarded by Web servers to the present invention, and to interact with other communication systems and networks, and their associated managed objects, to obtain information from the managed systems and communicate that information back to the Web client in response to the request. It is an object of the present invention to provide a "manager of managers" capability for networks, acting remotely through the Web. It is an object of the present invention to provide a common Web GUI for network management, whether remote through the Web, or local.

The present invention for the first time permits a Web client, communicating through a Web server, to perform network management. If more than one network is managed through the Web, then a manager of managers function is provided. If the Web is used to manage one or more networks, then the management is done remotely. If the management is not done through the Web but is provided locally, then the same common Web interface is provided to the user, as when remote management is provided through the Web. This for the first time provides such a common Web interface for network management.

The present invention receives requests from a Web client forwarded by a Web server and interacts with the managed networks and their associated objects to obtain information. The present invention then converts this information in real time to hypermedia document format in HTTP and HTML, and transmits this information to the Web client via the Web server, appearing to the client as if the information received were a Web file ab initio. This permits a Web user to manage multiple networks and access multiple networks via a single Web client. The Web client does not need to inform the Web server of the name of each gateway program necessary.

The present invention for the first time provides a unified, remote, graphical, transparent interface for Web users, using a Web client, to a variety of managed networks. The present invention provides a standard interface for network management and communications. The present invention is platform-independent, using readily available client software. The present invention uses standard protocols and provides hypermedia support.

The present invention for the first time provides a network management system operating through the Web, or with a Web user interface, with a centralized point of control over an entire multi-vendor network or networks. In the present invention, communication flows between the central network management system and the systems that manage individual network devices and objects, so that a local and central management system provides a common user interface and common means for monitoring and controlling devices on a network.

By providing a network management gateway function to the Web, the present invention makes any commercially available Web client into a powerful remote network management station providing world-wide access via the Internet. The present invention solves the problem of providing a standard network management interface that is independent of the system being managed, and provides a solution of the "manager of managers" problem so that a user can manage multiple remote networks via a single Web client.

With the present invention, the Web client presents the user interface to the Web user and allows for simultaneous access into different managed networks.

BRIEF DESCRIPTION OF THE DRAWINGS

The present invention may be better understood with reference to the detailed description of the preferred embodiment, in conjunction with the following figures. In the figures, like numerals denote identical elements.

DETAILED DESCRIPTION OF THE PREFERRED EMBODIMENTS

The present invention can be embodied as a software application resident on a Web server, or a software application resident on a separate programmable device that communicates with a Web server through the Internet, or as a software application resident on a programmable device, or as software on a tangible computer-useable memory medium, or otherwise. Embodiments comprising software applications resident on programmable devices are preferred. As is the case with all software applications, the present invention can be embodied as hardware with specific circuits, although these circuit embodiments are not now preferred because of their cost, lack of flexibility, and expense of modification.

Figure 1:
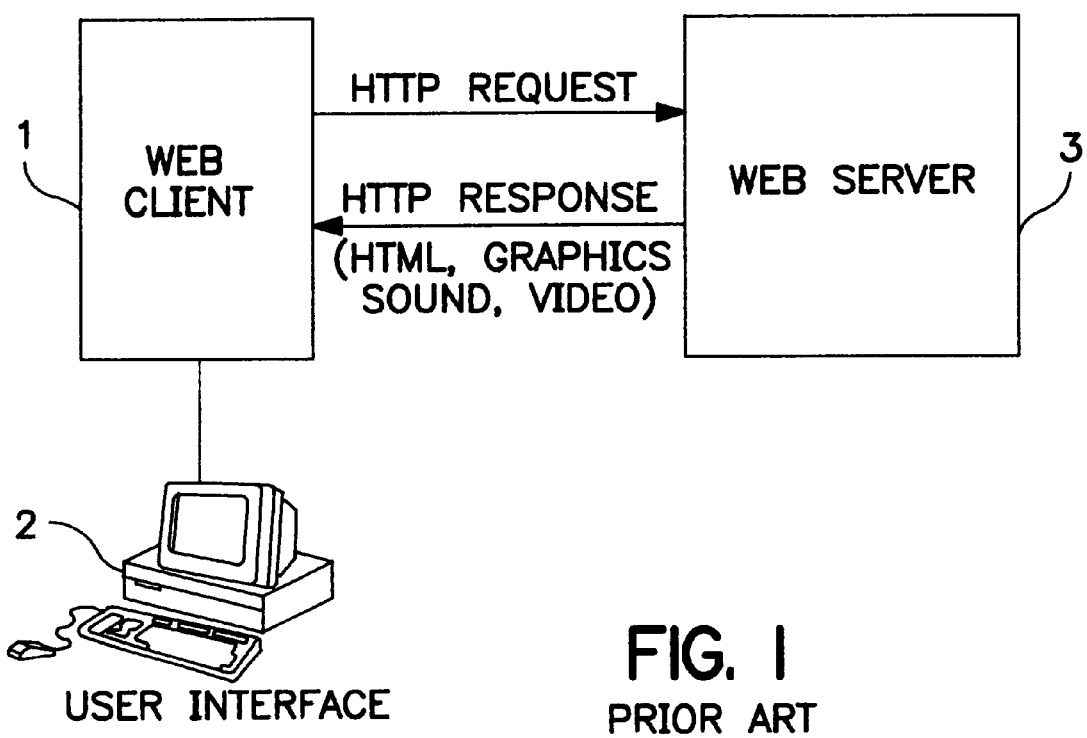
FIG. 1 is a diagram showing the architecture of the traditional Web client/server operation.

FIG. 1 is a diagram showing the architecture of the traditional Web client/server operation. A Web client 1 supports a user interface 2, which is a graphical user interface (a "GUI"). A Web client 1 formulates a request for information in HTTP and transmits it by the Internet (or by another network using Internet protocols) to a Web server 3. The Web server 3 forwards the request on the Internet (not shown), or the request is forwarded in the host computer if the request is to be serviced locally. The Web server 3 receives a response in HTTP, or formulates a response in HTTP, and forwards the response in HTTP to the Web client 1. The Web client 1 then generates an HTML, graphics, sounds, or video display and presents the response through its user interface 2.

Figure 2:
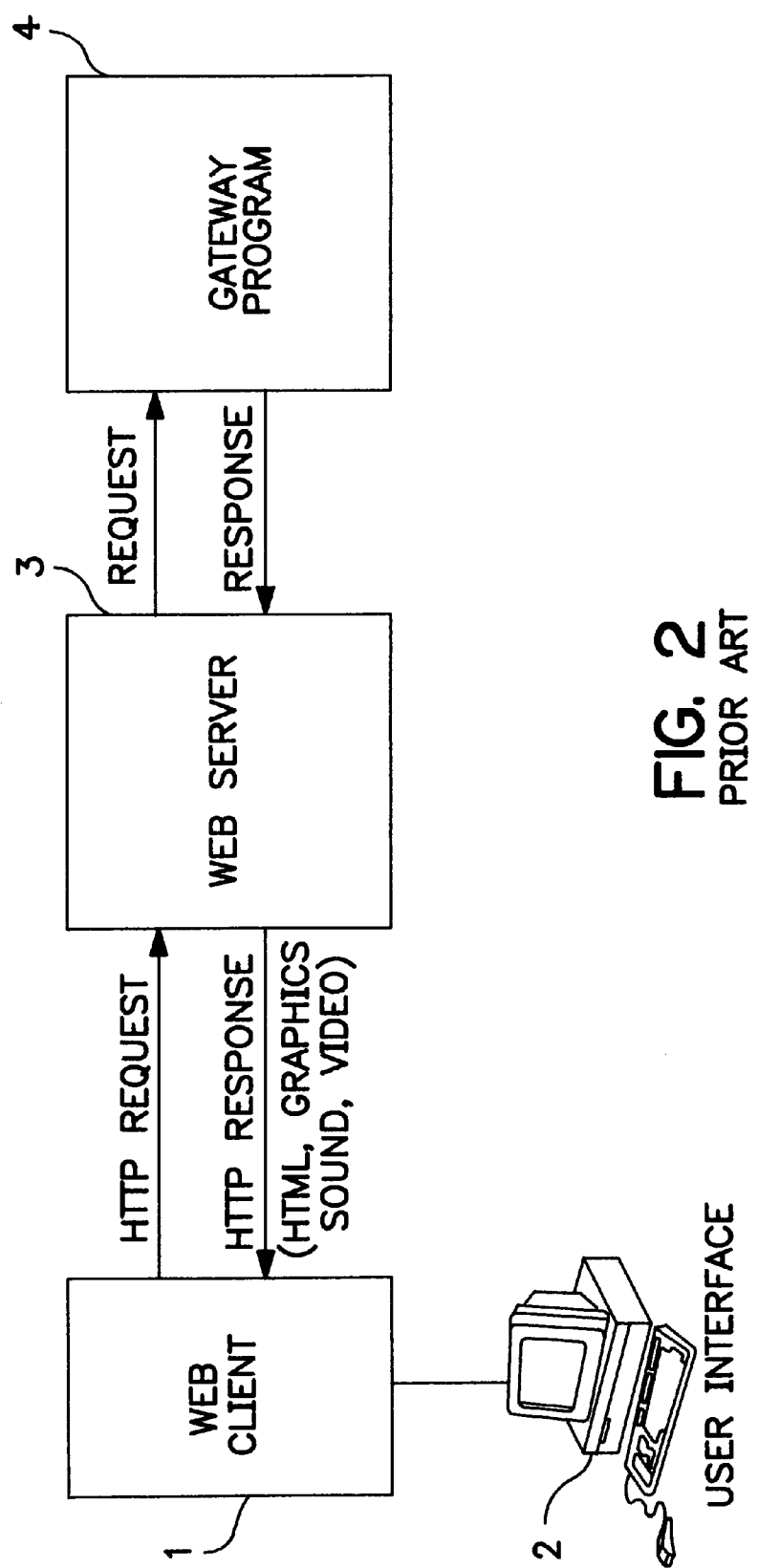
FIG. 2 is a diagram showing the network architecture of the traditional Web client/server operation using a gateway application.

FIG. 2 shows the architecture of the traditional Web client/server operation using a gateway application. Any of the many and increasing number of Web clients 1, using a GUI 2, formulates a request for information in HTTP and transmits it by the Internet (or by another network using Internet protocols) to any one of the many Web servers 3. The Web server 3 recognizes the request as one to be forwarded to the appropriate gateway 4, and forwards the request directly or indirectly to the appropriate gateway 4.

The gateway 4 routes the request to the appropriate Internet resource (not shown), first making any necessary changes in the communication protocol used. Requests handled in this manner may include, for example, Gopher requests, FTP requests, or database queries. The Internet resource (not shown) then formulates a response and returns the response to the gateway 4 in the same protocol. The gateway 4 forwards the response in HTTP to the server 3, which forwards it to the client 1. The client 1 then generates an HTML, graphics, sound, or video display on the user interface 2, or another form of presentation of the information to the user. The common gateway interface ("CGI") specification is often used to define a standard interface for gateway programs to interface with Web servers.

Figure 3:
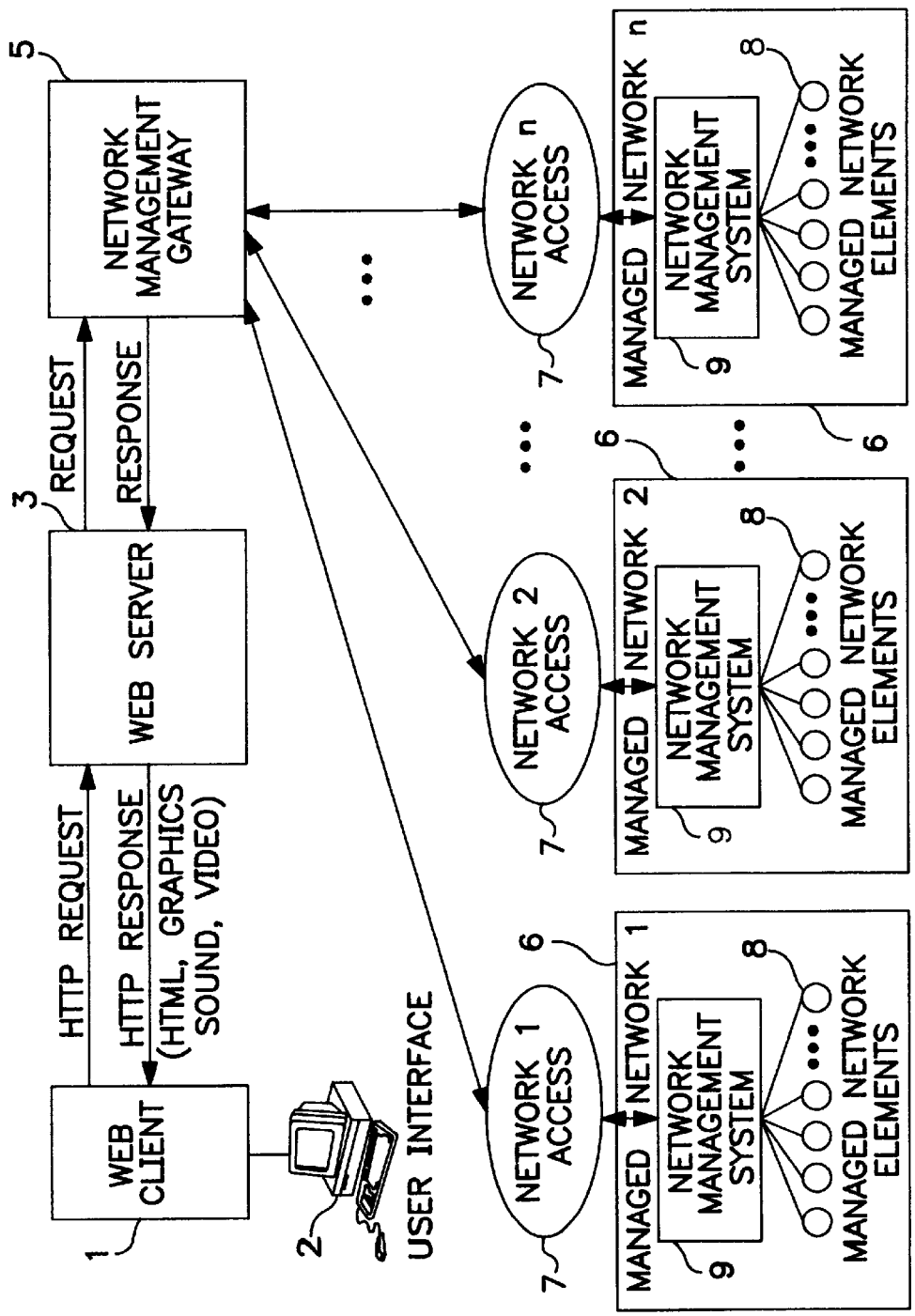
FIG. 3 is a diagram showing the network architecture of the present invention.

FIG. 3 shows the network architecture for the present invention 5 when used for remote network manager of manager functions through the Web. A conventional Web client 1, supporting a GUI 2, makes a request for information to a Web server 3 using HTTP, through the Internet (or through another network using Internet protocols). The Web server 3 recognizes that the information to be retrieved pursuant to the request must be obtained by the present invention 5, the network management gateway 5 ("NMG"), and the Web server 3 forwards the request to the present invention 5, communicating through the Internet or otherwise. The present invention 5 parses and translates the request, converts the request into the appropriate network management service requests, and forwards each request to the appropriate managed network 6 using the appropriate communication protocol (for example, TCP/IP, frame relay, CDPD, or others) for each managed network 6, through the appropriate Internet (or other) network access 7. The processed requests are transmitted through the appropriate network management system 9, to the managed network elements 8, on the appropriate managed network 6. Examples of managed networks include SNNP-based networks, CMIP-based networks, SNA-based networks, Ethernet LANs consisting of routers, hubs, and workstations, ATM-based equipment, SONET-based equipment, and cellular telephony systems. Access to additional managed networks can be added to the present invention as they are developed, or as interest in them develops.

Information in response to each network management service request is received from the appropriate network management system 9 of each managed network 6 by the present invention 5, through the appropriate Internet (or other) network access 7.

The present invention 5 converts dynamically in real time each such response into HTML document files (that is, HTML files that are built "on the fly") and transmits them to the requesting Web server 3. The Web server 3 then returns the HTML files to the requesting Web client 1, where the information is then displayed on the user interface 2, or otherwise presented to the user. The presentation may include text, graphics, sound, and video.

Figure 4:
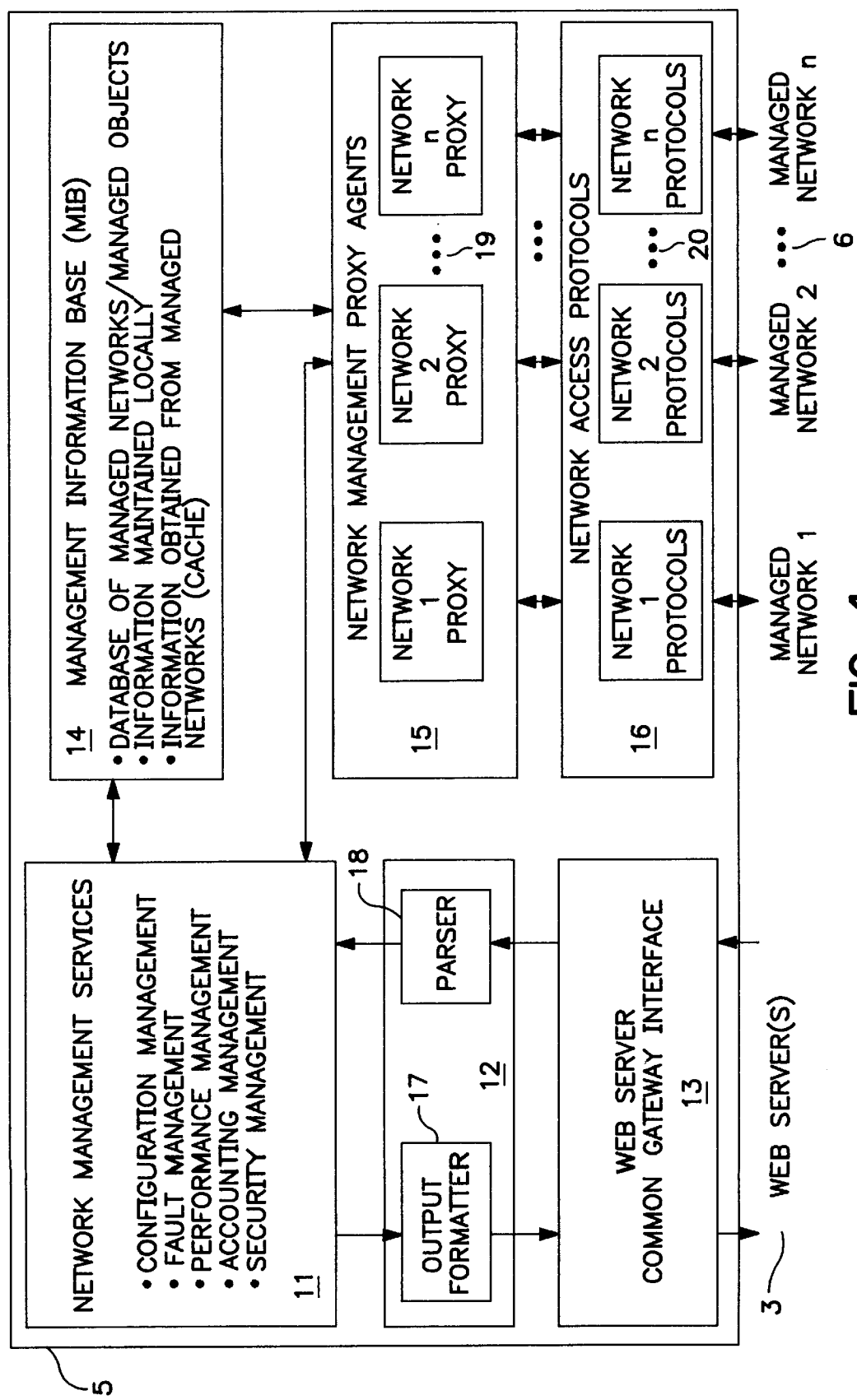
FIG. 4 is a diagram showing the structure of the present invention.

FIG. 4 shows the internal structure of the present invention 5 when used in the Internet (or other network) as a remote manager of managers. Network management services are provided by the NMG 5 by software modules 11 for, for example, network configuration management, fault management, performance management, accounting management, and security management. These software modules may include such functions as providing a help desk, customer service and support, software distribution, product information distribution, trouble ticket and reporting, and other functions.

Incoming HTTP requests from the Web server 3 are processed by the Web server CGI 13 resident in the NMG 5, and transmitted to the parser 18 in the parser/formatter 12. The parser 18 parses and translates the Web client requests into network management requests ("NMRs") which are communicated to the network management service modules 11 for processing. The modules 11 may transmit the NMRs to the Management Information Base ("MIB") 14, or the network management proxy agents 15, as appropriate. The MIB 14 is a database of managed networks 6, and managed object 8. The MIB 14 is maintained locally within the NMG 5, and communicates with the network management proxy agents 15. The MIB 14 contains a database of information regarding the managed networks 6 and information regarding the network management gateway 5.

The network management proxy agents 15 contain a network proxy 19 for each managed network 6. The agents 19 include network specific protocols and managers such as, for example: SNMP, CMIP, and proprietary protocols, or others.

The proxy agents 19 communicate with the network access protocols 16. There is an appropriate network protocol 20 to access each managed network 6. The access mode may be WAN, LAN, dial-up, wireless, or others. The protocols may be, for example: TCP/IP, SLIP, PPP, OSI, Frame Relay, proprietary, or others.

The appropriate data is then collected in response by the managed network 6 and objects 8, and then sent to the network access means 7. From there the responses are transferred to the present invention 5, which converts the network management information in real-time, on the fly, to HTML documents using the service modules 11. The present invention receives the information through the network access protocols 16, and the proxy agents 15, and transmits it to the service modules 11, and/or the MIB 14. The service modules 11 process the information, converting the information in real-time on the fly into HTML documents, which are then formatted for output by the output formatter 17 in the parser/formatter 12. The documents are then processed by the CGI 13 and passed to a Web server 3, and then to the client 1 through the Internet, or otherwise.

In the preferred embodiment, the NMG is a software application running on a hardware platform, and the various elements in FIG. 4 are component software elements running on the hardware platform.

Figure 5:
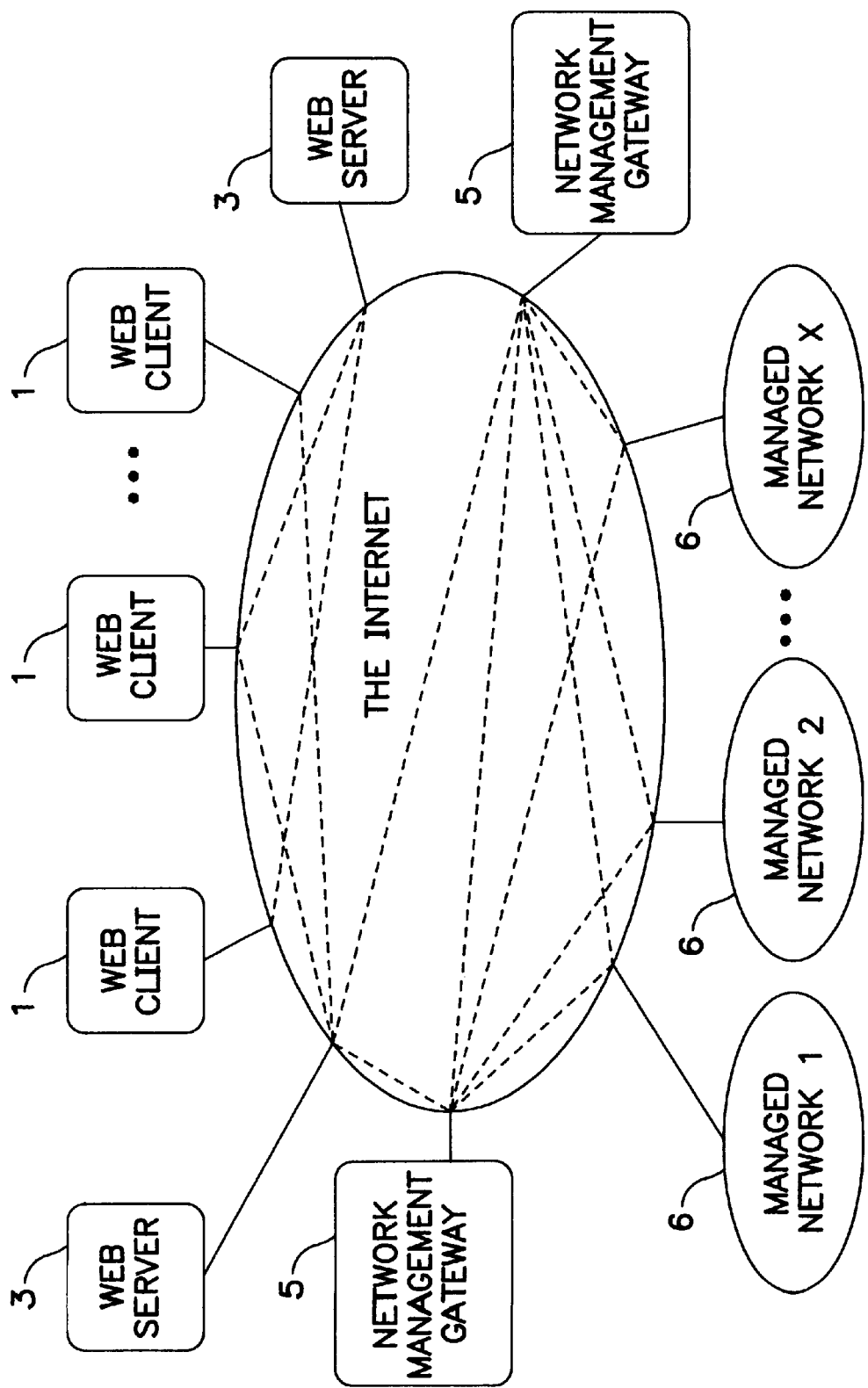
FIG. 5 is a diagram showing the network management gateway system concept of the present invention.

FIG. 5 shows the network management gateway system concept of the present invention. Web clients 1 communicate through the Internet to Web servers 3. The servers 3 communicate to the present invention 5, through the Internet, or otherwise. The present invention 5 parses and translates the client 1 requests into a number of NMRs, converts each NMR to the appropriate protocol, and transmits each NMR through the Internet or otherwise to the appropriate managed network 6. The managed network 6 develops a response, and transmits the response back to the present invention 5, the NMG, arriving as a real-time HTML document at the client 1, as described in more detail above regarding FIG. 3 and FIG. 4.

Figure 6:
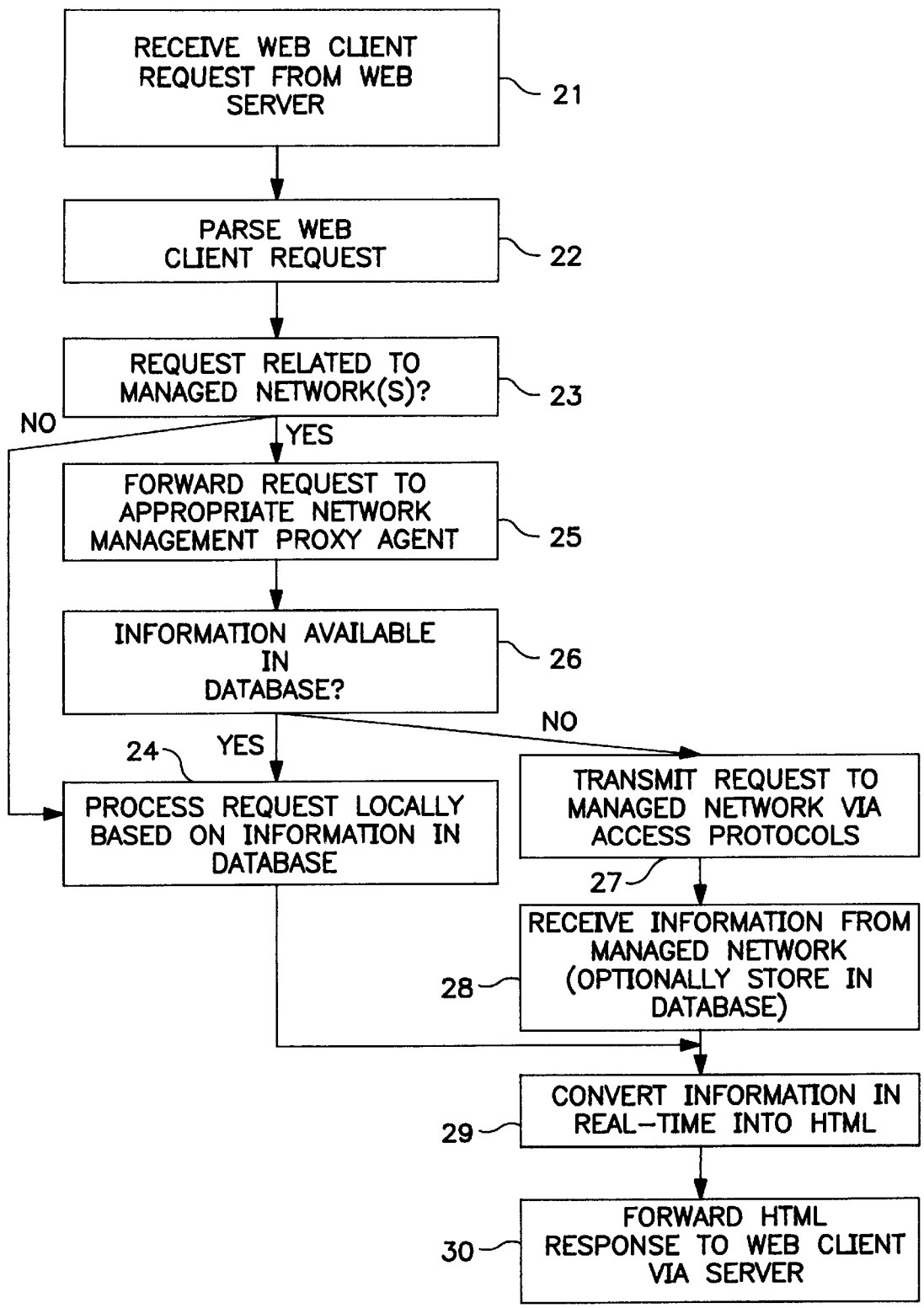
FIG. 6 is a flow chart showing the network management gateway method of the current invention.

FIG. 6 is a flow chart showing the network management gateway method of the current invention. The first step of the method is to receive 21 a Web client request from a Web client, through a Web server. Then, the Web client request is parsed and translated 22 with a programmable device, or a circuit device, into at least one network management request ("NMR"). The NMR is analyzed 23 as to whether processing the NMR requires interaction with one or more managed networks. If not, the NMR is processed locally 24; and if so, the NMR is forwarded to an appropriate network management proxy agent 25. After the forwarding step 25, the network management proxy agent determines whether the information is in the local database 26. If yes, the information is obtained 24 therefrom; and if not the NMR is transmitted 27 to a managed network 6 by access protocols. Then network management information transmissions are received 28 in response to each NMR from a managed network (and may be stored in the local database for future retrieval). Then each such transmission is converted 29 in real-time into at least one HTML document. Then the HTML documents are transmitted 30 to the Web client through a Web server. When data is obtained 24 locally from a database, it is likewise then converted 29 into HTML and forwarded 30.

The information from the networks may result in information presented to the user as one document or as multiple documents. Any document transmitted may have hyperlinks to any other documents created, which the user may or may not choose to call up.

The Web client request may be received 21 by receiving a communication through the Internet.

Transmitting each NMR 23 may be done by converting each NMR into the appropriate network protocol and accessing each appropriate network.

Transmitting 26 the HTML document may be done by converting the HTML document into the appropriate Internet protocol, and transmitting the HTML document to the appropriate Web server.

The Web client requests dealt with by this method may include requests related to configuration management, fault management, performance management, accounting management, security management, or other functions.

A partial list of commercial and freeware Web clients that are readily available for use with the present invention include: Netscape, by Netscape Communications Corporation (which supports Macintosh, Windows, and X-Windows for the Web client browser platform); NCSA Mosaic, by the National Center for Supercomputing Activities (which supports Macintosh, Windows, and X-Windows for the Web client browser platform); Enhanced Mosaic, by Spyglass, Inc. (which supports Macintosh, Windows, and X-Windows for the Web client browser platform); and Web Explorer, by IBM Corporation (which supports OS/2 Warp for the Web client browser platform). These browsers exist on most common platforms and are relatively inexpensive (retailing for less than $50) or free. Also, note that many Web servers (for example, NetScape, NCSA Mosaic, and Process Software) exist that can readily be used with the present invention.

The present invention uses the appropriate networking protocols and network management protocols to communicate with each managed network. Examples of such networking protocols include standards such as TCP/IP, OSI X.25, SNA, and Frame Relay, as well as various proprietary protocols. Examples of such network management protocols include standards such as SNMP, CMIP, and TL1, as well as various proprietary network management protocols.

No changes are required to the Web client 1 software or the Web server 3 software to use the present invention. As new networks 6, network protocols 7 and network applications are developed and targeted for access through the Web, they need only be accessed by the present invention 5, with appropriate modifications to the present invention 5, in order to provide access to a Web server 3, or Web user 1. This can be done without any change to the server 3 or user 1 accessing the present invention 5.

The present invention provides a manager of manager function (sometimes called "M.O.M."). That is, the present invention provides the ability to manage multiple networks and multiple applications from a single platform, which is a Web client. To do this, the Web client can use a single graphic user interface ("GUI").

Multiple embodiments of the current invention can be accessed from a single Web client using hypertext link capabilities with the HTTP/HTML protocols.

The present invention facilitates traditional network management service applications such as configuration management (which includes tracking and changing network configuration from remote locations), fault management (which includes the ability to isolate, diagnose, resolve and log network problems on a real-time basis to maximize network availability), performance management (which includes the optimization of network performance through network performance data collection and analysis), accounting management (which includes the collection of statistical information on network use by subscribers), and security management (which includes the control of network access and use). Thus, the present invention can provide functions such as a help desk, customer service and support, software distribution, trouble ticket and reporting, and other functions. The present invention provides the ability to give different customer/users different views of the managed information, that is, suppress information, provide additional information, support different commands, and other functions.

The present invention will lead to and includes a new paradigm for computer users. That is, as a result of the use of the present invention, computers will come to use a Web GUI even when the computer is not connected to the Web. The Web interface will be used by the computer to interface with the user for all purposes, and not just for Web interactions, and not just for network manager-of-managers functions on the Web.

Note that information in the MIB can also be placed on CD-ROM as an archive of the information. The user can then use the same user interface of the present invention to browse the CD-ROM, as if accessing the managed network. The present invention could use the information on the CD-ROM as part of the local database 14 (for retrieval purposes), as discussed regarding FIG. 6, to process an NMR locally 24.

The embodiments described herein are merely illustrative of the principles of this invention. Other arrangements and advantages may be devised by those skilled in the art without departing from the spirit and scope of the invention. Accordingly, the invention should be deemed not to be limited to the above detailed description, but only by the scope of the claims which follow and their equivalents.

For example, for purposes of the present invention, all programmable devices are equivalent, including without limitation computers, ASICs, microprocessors, computer chips, and special purpose devices with programmable components. Furthermore, any programmable device with a specific software application is equivalent to a non-programmable circuit that does the same thing that is done by the programmable device with the software.

Furthermore, a programmed device programmed to do a certain process is equivalent to that process done by that programmed device, and both are equivalent to the software on a tangible computer-useable medium. That is, all software inventions can be claimed in any or all of three equivalent ways: as a device programmed to do a process, and as the process done by the programmed device, and as the software program resident on a tangible computer-useable medium.

The mention of the Internet herein is equivalent to the use of any network using Internet protocols, and to any communications network. Likewise, the Web servers and Web clients herein are equivalent to any servers and clients using Web protocols. Also, the Web is equivalent here to any network using Web protocols, or any hypermedia network.

One example of an embodiment of the present invention would allow for remote reconfiguration of, say, a phone network through the Web. A company may have several offices, each with a phone system controlled through an on-site computer. The system may be configured to offer different features (such as long distance capability) to different phones, and to maintain call accounting data for each phone. If the phone network control computer in each office were accessed to the Web, then with an embodiment of the present invention, a single remote user (from a single Web client, using a single Web GUI) could control, manage, reconfigure, and account for all the company's phone systems. This may be done through a single GUI, even where each office uses separate incompatible systems manufactured variously, for example, by Rolm, Siemens, AT&T, GTE, and others. Likewise, the embodiment could be modified to add new systems by new manufacturers, say, NT&T, at a later date. Likewise, this embodiment could be used by a single party, say an equipment manufacturer or service provider, to manage a variety of phone systems for unrelated companies. Also, the embodiment could be modified to manage other office equipment in addition to the phones, for example, copiers, vending machines, and security systems. Of course, this is only one possible embodiment, and does not limit the claims.

We claim:

1. A manager of managers process comprising:
   a. supporting a Web GUI on a Web client;
   b. accessing a Web server using the Web GUI;
   c. accessing a network management gateway using the Web server;
   d. accessing a plurality of incompatible networks and devices using the network management gateway; and
   e. managing the plurality of incompatible networks and devices using the GUI, which accesses the server, which accesses the network management gateway, which accesses the networks and devices.

2. The manager of managers process in claim 1, where the accessing and managing is done by electronically communicating through the Web.

3. A manager of managed systems comprising:
   a. at least one Web client supporting a Web graphical user interface;
   b. at least one Web server electronically communicating with each Web client;
   c. at least one network management gateway electronically communicating with at least one such Web server;
   d. at least one managed network electronically communicating with each network management gateway, each managed network including at least one managed network element and
   e. at least one Web graphical user interface for managing a plurality of incompatible managed networks.

4. The system in claim 3, the network management gateway further comprising:
   a. means for converting Web client requests into network management requests; and b. means for converting network management information into HTML documents in real-time, electronically communicating with the means for converting Web client requests.

5. A manager of managers system comprising:
a. means for supporting a Web GUI on a Web client;
b. means for accessing a Web server using the Web GUI;
c. means for accessing a network management gateway using the Web server;
d. means for accessing a plurality of incompatible networks and devices using the network management gateway; and
e. means for managing the plurality of incompatible networks and devices using the GUI, which accesses the server, which accesses the network management gateway, which accesses the networks and devices.

6. The manager of managers system in claim 5, where the means for accessing and the means for managing electronically communicate with each other through the Web.

7. A device comprising:
a. a stand-alone programmable computer;
b. a Web graphical user interface, supported on the programmable computer, that interfaces electronically communicating with at least one software application on the programmable computer; and
c. a software application, interfaced with the Web graphical interface, managing a plurality of incompatible networks and devices, by accessing a Web server, which accesses a management gateway, which accesses the network and devices.

* * * * *

UNITED STATES PATENT AND TRADEMARK OFFICE
CERTIFICATE OF CORRECTION

PATENT NO. : 6,145,001
DATED : November 7, 2000
INVENTOR(S) : Witowsky et al.

It is certified that error appears in the above-identified patent and that said Letters Patent is hereby corrected as shown below:

Under "Inventors," the following corrections and additions need to be made:

Delete the second listing of the inventor William E, Witowsky, Gaithersburg Maryland.
In its place please add Thomas H. Scholl, Gaithersburg, Maryland.

Signed and Sealed this

Twelfth Day of June, 2001

*Attest:*

*Attesting Officer*

NICHOLAS P. GODICI
*Acting Director of the United States Patent and Trademark Office*